United States Patent Office — 3,845,205 — Patented Oct. 29, 1974

3,845,205
2-LOWERALKYLTHIOADENOSINES
Mary Helen Maguire, Roland Herbert Thorp, and Denis Michael Nobbs, Sydney, New South Wales, Australia, assignors to The University of Sydney, New South Wales, Sydney, Commonwealth of Australia
No Drawing. Original application June 4, 1970, Ser. No. 43,570. Divided and this application May 4, 1973, Ser. No. 357,438
Int. Cl. A61k 27/00
U.S. Cl. 424—180          4 Claims

ABSTRACT OF THE DISCLOSURE

2-Loweralkylthioadenosines and pharmaceutical compositions and methods for producing coronary vasodilatation and hypotensive activity with these compounds.

---

This is a division of application Ser. No. 43,570 filed June 4, 1970, now U.S. Pat. No. 3,752,805.

This invention relates to new chemical compounds and to pharmaceutical compositions and methods for producing coronary vasodilatation and hypotensive activity with these compounds.

The compounds of the present invention are 2-loweralkylthioadenosines having the following structural formula:

FORMULA I

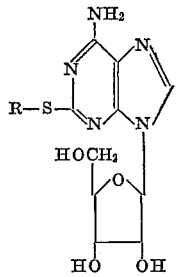

in which R is an alkyl group having 2 to 4 carbon atoms.

The compounds of the present invention have hypotensive activity and, in particular, 2-ethylthioadenosine has hypotensive activity of prolonged duration. The latter compound especially produces a specifically dilator effect on blood vessels without an inhibitory effect on the heart.

2-Ethylthioadenosine injected at 1 mg./kg. intravenously in anesthetized dogs lowers the blood pressure by approximately 40 mm. Hg for a period in excess of 60 minutes. There is no inhibitory effect upon the heart which shows a slight increase in rate as a result of reflex compensation. By the same procedure, 2-methylthioadenosine at 2 mg./kg. produces a blood pressure fall of approximately 20 mm. Hg of less than 30 minutes duration. Adenosine, in the same test procedure, at 0.25 mg./kg. produces a blood pressure fall of approximately 30 mm. Hg with duration of 1–2 minutes and there is at the same time marked slowing of the heart and in other species (e.g. guinea pig) cardiac arrest may occur. $N^6$-Methyladenosine produces activity similar to that described above for adenosine. 2-Chloroadenosine at 25 µg./kg. intravenously in anesthetized dogs produces a fall in blood pressure of approximately 55 mm. Hg with a duration of 20 minutes, together with depression and slowing of the heart; in several species cardiac arrest occurs.

Thus, 2-ethylthioadenosine has a long duration of action and causes a fall in blood pressure without a depressant effect upon the heart. Unlike adenosine, 2-chloroadenosine and $N^6$-methyladenosine which cause similar systolic and diastolic blood pressure falls, 2-ethylthioadenosine has predominantly the effect of producing a fall in diastolic blood pressure without any evidence of cardiac toxicity.

In the cat, rat and guinea pig, intravenous injection of ½ mg./kg. of 2-ethylthioadenosine produces a fall in blood pressure of very long duration.

2-Ethylthioadenosine shows a very low level of toxicity. In mice no toxic effect is seen in doses up to 250 mg./kg. administered intraperitoneally or 72 mg./kg. administered intravenously. None of the mice showed any change in behaviour and no deaths resulted.

In anesthetized dogs arranged for the measurement of coronary blood flow, force of cardiac contraction, blood pressure and limb blood flow, 2 - n - propylthioadenosine shows a much greater duration of effect than adenosine upon coronary blood flow which increased to double the resting rate with doses ranging from 2.5–50 µg./kg. without a general fall in blood pressure. When the dose was increased up to 250 µg./kg. the coronary circulation showed very marked improvement. There was no significant effect upon systolic blood pressure and the force of contraction of the heart was doubled due to the improved cardiac blood supply. No toxic effect were seen. With doses of 50–500 µg./kg. the duration of the coronary dilator effect was 1½ to 2 hours after a single injection of this substance.

2-n-Propylthioadenosine showed a greater and more powerful coronary dilator effect than other lower alkylthioadenosines. To produce a two to three fold increase in the coronary blood flow the following potency values of these compounds were found in comparison with adenosine:

Adenosine 1.0, 2-methylthioadenosine 0.03, 2-ethylthioadenosine 0.11, 2-n-propylthioadenosine 0.48 and 2-isopropylthioadenosine 0.37. The duration of effect with adenosine lasted only 30 seconds but with all other analogues is as more prolonged and with 2-n-propylthioadenosine extended for 2 hours according to the dose given.

2-n-Propylthioadenosine and 2 - isopropylthioadenosine do not show any toxic effects when given to mice by intraperitoneal injection in doses of 10, 50, 100, 250 mg./kg. which is 1000 times the effective coronary dilator dose or more.

In these compounds the effect upon blood platelets has been minimised. When adenosine is added to platelet-rich plasma aggregation of the platelets is inhibited when this is stimulated by adenosine diphosphate. The potency of 2-ethylthioadenosine is less than 1/50 that of adenosine and 2-n-propylthioadenosine is less than 1/10 of adenosine. 2-Isopropylthioadenosine is also less than 1/10 as active as adenosine. These analogues are without a significant effect upon platelet adhesion.

The compounds of the present invention may be prepared by condensing the chloromercuri derivative of the corresponding 2-loweralkyl-thio-6-benzamidopurine with 2',3',5'-tri-o-benzoylribofuranosyl chloride and treating the resulting intermediate with ammonia. Thus, 2-ethylthioadenosine may be prepared by condensing the chloromercuri derivative of 2-ethylthio-6-benzamidopurine with 2',3',5'-tri-o-benzoylribofuranosyl chloride and treating the resulting intermediate with ammonia. 2-Loweralkylthio-6-benzamidopurines may be prepared from the corresponding 2 - loweralkylthioadenines by treatment with benzoic anhydride. 2-Ethylthioadenine for example may be prepared from 2,6-diethylthiopurine by treatment with aqueous ammonia for example at 150–160° C., or 2-loweralkylthioadenines may be prepared from the corresponding 2-loweralkylthio-6-chloropurines by treatment with aqueous ammonia for example at 60° C.–80° C.

Alternatively, 2-loweralkylthioadenosines may be prepared by reaction of sodium loweralkylthiomercaptides with 2-chloroadenosine in dimethylformamide at 60°–80° C.

Alternatively, 2-loweralkylthioadenosines may be prepared by fusing 2-loweralkylthio-6-chloropurines *in vacuo* with 1-*o*-acetyl-2',3',5'-tri-*o*-benzoyl-β - D - ribofuranose and treating the resulting intermediate with ammonia.

For therapeutic use, a 2-lower alkylthioadenosine of Formula I above is preferably administered in combination with a pharmaceutical carrier. These pharmaceutical compositions also form part of the present invention. Advantageously, the compositions can be used in dosage unit form appropriate to the desired mode of administration, which may be intravenous, intramuscular, subcutaneous or oral. The pharmaceutical carriers may be, for example, water, saline or excipients for tablet formulation.

The method of producing hypotensive activity, according to this invention, comprises administering internally, in an amount sufficient to produce said activity, a compound of Formula I above.

The following examples are not limiting but are illustrative of the invention.

EXAMPLE 1

2,6-Diethylthiopurine (10 g.) and 300 ml. of aqueous ammonia saturated at 0° C. are heated at 155° C. for 24 hours. The reaction mixture is evaporated to small volume and 2-ethylthioadenine is filtered off and recrystallized from methanol.

Five grams of 2-ethylthioadenine and 17.5 g. of benzoic anhydride are heated at 160° C. for 30 minutes, then cooled. Ethanol (150 ml.) is added and the mixture is refluxed for 20 minutes and evaporated *in vacuo*. The residue is crystallized from ethyl acetate-ether, filtered and the filtrate evporated to an oil which recrystallized from benzene-*n*- hexane. 2-Ethylthio-6-benzamidopurine is thus obtained. After recrystallization from methanol-water this product melts at 179–180° C.

Five grams of 2-ethylthio-6-benzamidopurine is added to a stirred solution of 4.55 g. of mercric chloride in 100 ml. of 50% aqueous ethanol followed by 6.7 ml. of 10% aqueous sodium hydroxide. The resulting suspension is stirred for 16 hours and filtered to give chloromercuri-2-ethylthio-6-benzamidopurine.

Chloromercuri-2-ethylthio-6-benzamidopurine (8.40 g.) is suspended in 200 ml. of dry xylene and the suspension is refluxed with removal of water. A solution of 2,3,5-tri-*O*-benzoylribofuranosyl chloride (prepared from 7.92 g. of 1-*O*-acetyl-2,3,5-tri-*O*-benzoyl-β-D-ribofuranose by treatment at 3° C. with anhydrous hydrochloric acid in ether) in 50 ml. of dry xylene is added. The mixture is stirred and heated under reflux for four hours, then filtered, and the filtrate evaporated to dryness *in vacuo*. The residue is dissolved in chloroform and the solution is washed with 30% aqueous potassium iodide and with water, then dried over sodium sulfate and evaporated to give 2-ethylthio - 6 - benzamido-9-2',3',5'-tri-*O*-benzoyl-β-D-ribofuranosylpurine.

2-Ethylthio - 6 - benzamido-9-2',3'-5'-tri-*O*-benzoyl-β-D-ribofuranosylpurine (10.4 g.) is dissolved in 300 ml. of dry methanol saturated with ammonia at 0° C. and the solution is kept at 3° C. for four days. The solution is evaporated to give an oil which is triturated with hot ethyl acetate. The residue is recrystallized several times from water to give 2-ethylthioadenosine, m.p. 211–212° C.

Alternatively, crude 2-ethylthio-6-benzamido-9-2',3',5'-tri-O-benzoyl-β-D-ribofuranosylpurine is purified by column chromatography before treating with ammonia.

EXAMPLE 2

Sodium (345 mg.) was added gradually to 20 ml. of ethyl mercaptan at room temperature. After the sodium had completely reacted 20 mls. of anhydrous dimethylformamide was added and the mixture was heated at 80°–90° C. to give a clear solution. 2-Chloroadenosine (302 mg.) was added and the solution was heated for 5 hours. Excess ethyl mercaptan was distilled at 80° C., the residual solution was neutralised with HCl and evaporated to dryness. The residue was extracted with absolute ethanol (2×100 ml.), the extract was filtered and the filtrate was evaporated to a glass (320 mg.) which was crystallized from H$_2$O to give white needles of 2-ethylthioadenosine (225 mg.). Chromatography in butanol:water (86:14) and in di-isopropyl ether:ethanol (25:10) saturated with water showed that there was no contamination with 2-chloroadenosine.

EXAMPLE 3

By the procedure of Example 2 using *n*-propylmercaptan in place of ethylmercaptan the product is 2-*n*-propyl-thioadenosine.

Similarly using isopropylmercaptan in place of ethylmercaptan, the product is 2-isopropylthioadenosine, m.p. 188–189° C.

Similarly using isobutyl mercaptan in place of ethyl mercaptan the product is 2-isobutyl-thioadenosine.

Similarly using *tert*-butylmercaptan in place of ethylmercaptan the product is 2-*tert*-butylthioadenosine.

Similarly using *n*-butylmercaptan in place of ethylmercaptan the product is 2-*n*-butylthioadenosine.

Similarly using *sec*-butylmercaptan in place of ethylmercaptan the product is 2-*sec*-butylthioadenosine.

EXAMPLE 4

2-Ethylthio-6-chloropurine (5.98 g.) and 13.3 g. of 1-*O*-acetyl - 2,3,5 - tri - *O* - benzoyl-β-D-ribofuranose are heated at 160–170° C. *in vacuo* for 35 minutes. Chloroform is added and the resulting solution is washed with saturated aqueous sodium bicarbonate solution and with water and then dried over sodium sulfate. The chloroform is removed by evaporation and the residue is treated with 350 ml. of dry methanol, saturated with ammonia at 0° C. and then is kept at room temperature for four days. The methanol is removed by evaporation and the residue is extracted with ethyl acetate and recrystallized several times from water to give 2-ethylthioadenosine.

EXAMPLE 5

*n*-Propyliodide (3.7 g.) was added to a suspension of 2-thio-6-hydroxypurine (3.4 g.) and potassium carbonate (2.8 g.) in dimethylformamide (15 ml.). After warming on a steam bath the reaction mixture was stirred at room temperature for 20 minutes, then poured into 25 ml. of ice water. The pH of the solution was adjusted to 4–5 with acetic acid. 2-*n*-Propylthio-6-hydroxypurine precipitated and was filtered and recrystallised from ethanol.

Phosphorus oxychloride (15 ml.) was added to a mixture of 1 g. of 2-*n*-propylthio-6-hydroxypurine and 1.5 ml. of N,N-diethylaniline. The mixture was refluxed for 1.25 hours, and unreacted phosphorus oxychloride was then distilled *in vacuo*. The residue was triturated with diethyl ether and water to give 2-*n*-propylthio-6-chloropurine as a pale yellow solid which was filtered and recrystallised from aqueous ethanol.

By the procedure of Example 4 using 2-*n*-propylthio-6-chloropurine in place of 2-ethylthio-6-chloropurine the product is 2-*n*-propylthioadenosine.

Similarly reaction of isopropyl iodide with 2-thio-6-hydroxypurine gives 2-isopropylthio-6-hydroxypurine which with phosphorus oxychloride gives 2-isopropylthio-6-chloropurine. 2-Isopropylthio-6-chloro-purine in place of 2-ethylthio-6-chloropurine gives by the procedure of Example 4 2-isopropylthioadenosine.

Similarly the reaction of 2-thio-6-hydroxy-purine with *n*-butyl iodide gives 2-*n*-butylthio-6-hydroxypurine, the reaction of 2-thio-6-hydroxypurine with isobutyliodide gives 2-isobutylthio-6-hydroxy-purine, the reaction of 2-thio-6-hydroxypurine with *sec*-butyl iodide gives 2-*sec*-butylthio-6-hydroxypurine and the reaction of 2-thio-6-hydroxypurine with *tert*-butyl iodide gives 2-*tert*-butylthio-6-hydroxypurine, and as described in Example 4 the reaction of either one of these four 2-butylthio-6-hydroxypurines in place of 2-ethylthio-6-hydroxypurine with phosphorus oxychloride gives the 2-butylthio-6-chloropurine.

Using 2-*n*-butylthio-6-chloropurine, or 2-isobutylthio-6-chloropurine, or 2-*sec*-butylthio-6-chloropurine or 2-*tert.*-butylthio-6-chloropurine in place of 2-ethylthio-6-chloropurine as described in Example 4, the products are 2-*n*-butylthioadenosine or 2-isobutylthioadenosine or 2-*sec*-butylthioadenosine or 2-*tert*-butylthioadenosine.

What is claimed is:

1. A pharmaceutical composition for producing coronary vasodilatation or hypotensive activity comprising a pharmaceutical carrier and a compound of the formula:

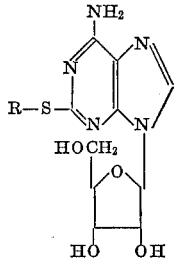

in which R is an alkyl group of from 2 to 4 carbon atoms.

2. A pharmaceutical composition according to claim 1 in which R is ethyl, *n*-propyl, or isopropyl.

3. A method of producing coronary vasodilatation or hypotensive activity which comprises administering internally in an amount sufficient to produce said activity, a compound of the formula:

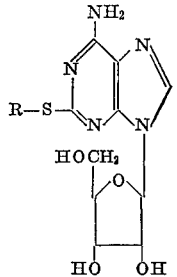

in which R is an alkyl group of from 2 to 4 carbon atoms.

4. A method according to claim 3 in which R is ethyl, *n*-propyl, or isopropyl.

References Cited
UNITED STATES PATENTS
3,471,471   10/1969   Maguire _____ 260—211.5

HENRY A. FRENCH, Primary Examiner

PO-1050
(5/69)

UNITED STATES PATENT OFFICE
CERTIFICATE OF CORRECTION

Patent No. 3,845,205          Dated October 29, 1974

Inventor(s) Mary Helen Maguire, Roland Herbert Thorp and Denis Michael Nobbs

It is certified that error appears in the above-identified patent and that said Letters Patent are hereby corrected as shown below:

Column 2, line 5, " 1/2 " should read -- 1-2 -- .

Signed and sealed this 24th day of December 1974.

(SEAL)
Attest:

McCOY M. GIBSON JR.
Attesting Officer

C. MARSHALL DANN
Commissioner of Patents